United States Patent Office 2,997,897
Patented Aug. 29, 1961

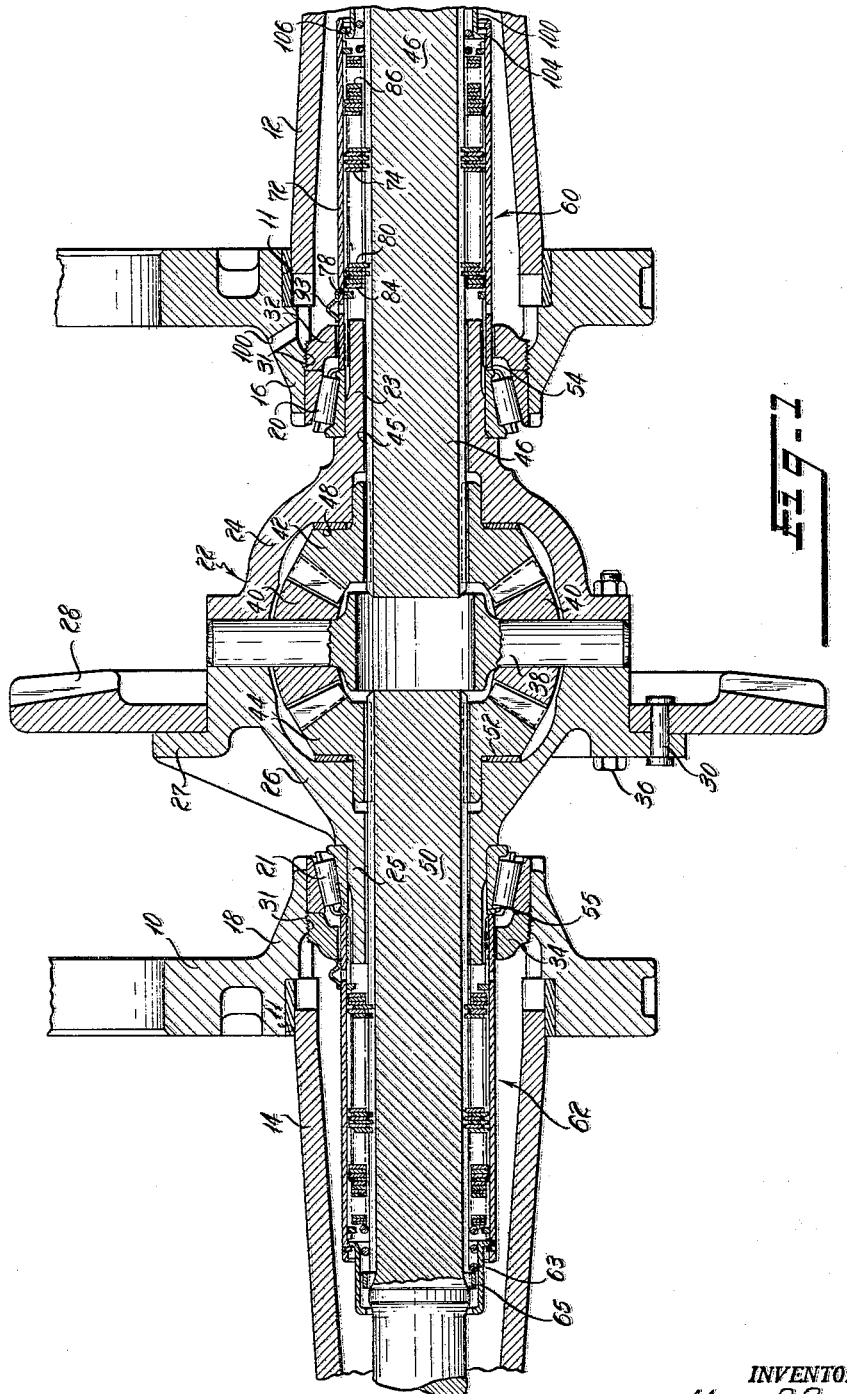

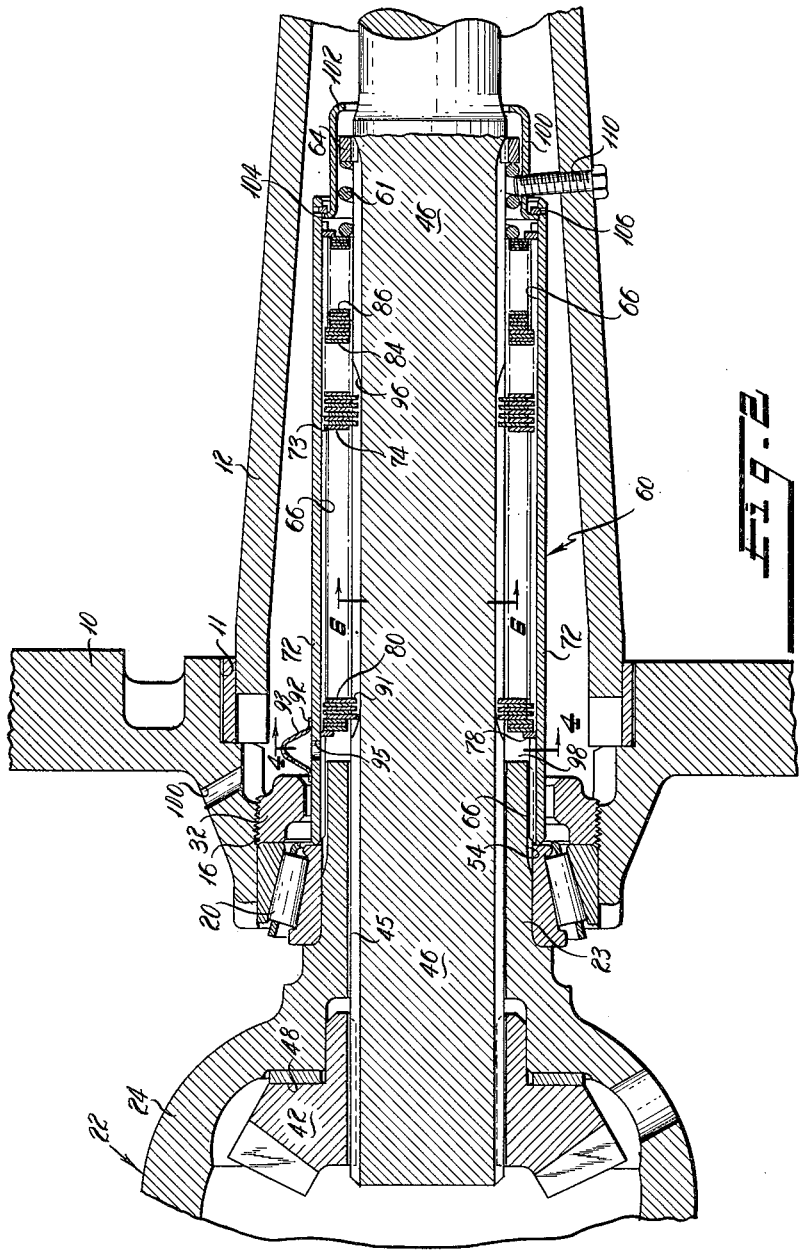

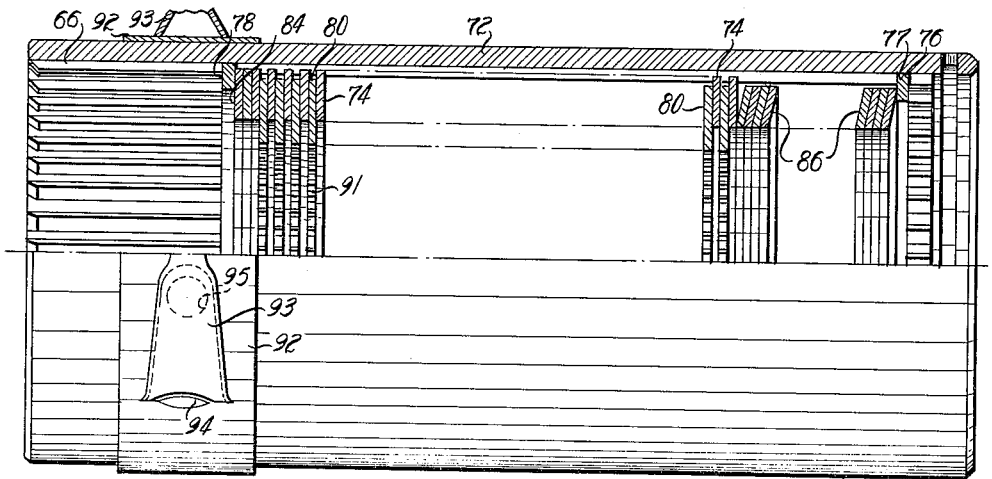
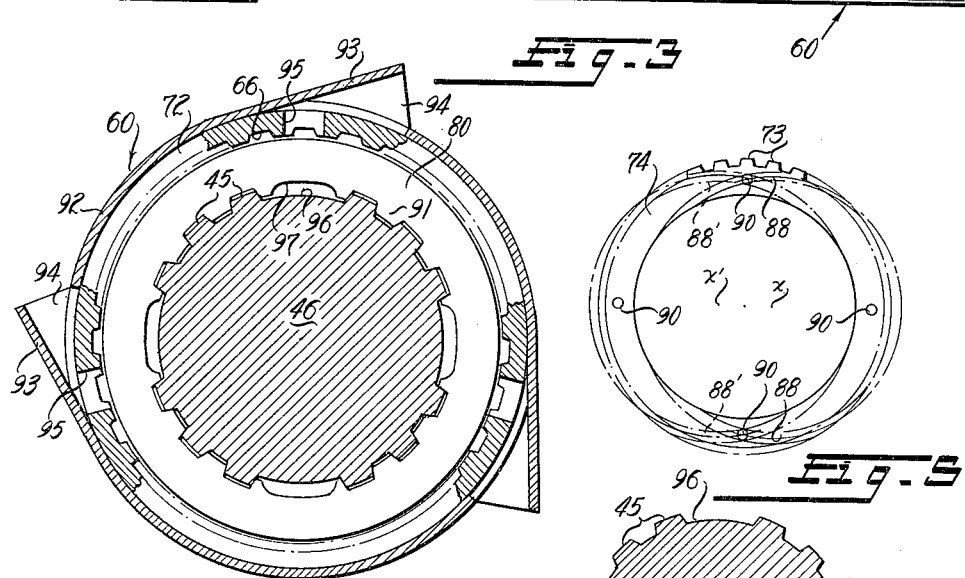
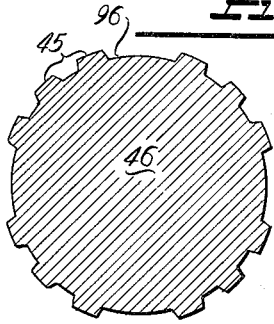
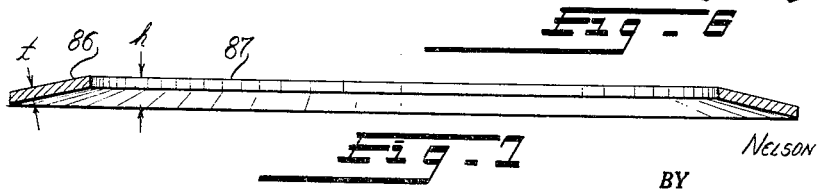

2,997,897
DIFFERENTIAL CLUTCH MECHANISM
Nelson R. Brownyer, Detroit, Mich., assignor to Rockwell-Standard Corporation, Coraopolis, Pa., a corporation of Pennsylvania
Filed May 6, 1958, Ser. No. 733,329
7 Claims. (Cl. 74—711)

This invention relates to vehicle drive mechanisms and more particularly to an axle differential drive with mechanism between the input and output of the differential providing a torque bias to prevent wheel spin when one wheel loses traction.

Inherent characteristics of conventional axle differentials result in occurrence of many well known traction problems. One group of such problems with which the present invention is concerned, is that torque, transmitted through conventional drive axle differentials is dissipated by spinning of the wheel or wheels on one side of the drive axle while but a small amount of torque is transmitted to the wheel having traction. This situation occurs frequently, for instance, when one driven wheel hits a slippery spot on the road surface or travels on soft ground, whereas the other driving wheel retains sufficient traction but, due to negligible torque transmission, will not be able to move the vehicle, and the vehicle becomes stalled. Another disadvantage of vehicles using conventional differentials is the tendency of the vehicle to swerve out of its original running direction when one wheel suddenly loses traction, an effect which could result in serious accidents. In any case, where one wheel loses traction and spins, the sudden regaining of traction of the spinning wheel may cause severe damage on the axle shaft, differential gears or other driving elements in the power train due to the abrupt heavy impact load. Such disadvantages are equally critical in the use of special equipment and military vehicles which often have to drive off the road.

In attempting to avoid such disadvantages encountered in the use of vehicles with conventional differentials, numerous vehicle drive axle differentials or separate positive locking differential mechanisms have been previously proposed.

A few of such previously proposed differentials which have been produced perform their assigned duty more or less successfully, but prior to this invention there have been no simple, practical differential locking or torque biasing mechanisms with sufficient advantages to be generally acceptable as providing the optimum solution of the problem involved.

Many of the previously proposed locking type differential mechanisms provide for driver control of differential locking actuation. In that type, positive locking is activated or inactivated only when the driver feels it necessary, a factor which naturally involves the hazard of neglect or carelessness on the part of the driver who might not at all times be able to determine when to lock the differential. In addition, the driver may forget to unlock the differential which, of course, results in undue strain on the wheel axle and other moving parts during normal vehicle operation.

Others of the aforementioned previously proposed differentials work on the principle of automatically applying friction to the differential gears, or to special camming surfaces within the differential, which results in an increased torque requirement on either one or both wheels to overcome the applied resistance within the differential case. Whenever one wheel tends to turn faster than the other one, because of lost traction, the friction elements inside or outside the differential become engaged to add friction forces to the faster turning wheel which in turn requires greater torque to turn the wheel having low traction. Reaction to this torque is applied through the differential to the other wheel which has the better traction. Thus a braking action is achieved on the spinning wheel sufficient to add torque on the gripping wheel to move the vehicle. As soon as both wheels gain traction, the friction elements in such prior art devices are released to permit the differential to differentiate when necessary. The mechanisms in some of the previously known differentials are arranged so the friction elements will not be engaged by a normal difference in wheel speed as for instance when rounding a curve, and come into play only when one or the other or both driving wheels lose traction.

In the present invention a type of compact disc clutch is provided outside of and adjacent to the differential housing to maintain friction as substitute for lost traction of one or the other driving wheels which requires a greater torque to turn both wheels sufficient to move the vehicle and to prevent spinning of either of the wheels.

Accordingly, a primary object of the present invention resides in providing a novel, constantly operating clutch between the differential and a vehicle drive axle shaft to prevent spinning of a wheel which has lost traction.

Another object of the present invention resides in the provision of a friction mechanism in the form of a novel multiple disc clutch for a differential drive axle in a motor vehicle which is capable of constantly maintaining a predetermined amount of friction to the differential mechanism to be overcome by a greater torque applied in equal amounts to both wheels.

A further object of the present invention resides in the provision of a novel self-contained mutiple disc clutch unit which can be quickly assembled and disassembled as a unit. A related object is to provide such self-contained clutch unit with novel means enabling appropriate cooling and lubrication of the clutch discs.

Another object of the present invention resides in the novel provision of annular arcuate cross-section spring plates such as Belleville springs in a compact disc clutch assembly to apply a predetermined, relatively high, fixed axial pressure on a minimum number of stacked clutch discs.

A still further object of the present invention resides in the provision of clutch discs in a multiple disc clutch made of surface hardened steel, as by cynamiding, and provided with curved oil grooves on both surfaces for lubrication and cooling purposes.

Still another object resides in the provision of a multiple disc clutch for the differential of a motor vehicle in which the unit pressure on the disc surfaces is lower than the normal pressure obtained in the maximum low gear torque condition presently utilized in differentials.

Still a further object of the present invention resides in the provision of a novel multiple disc clutch for a drive axle differential with a torque bias ratio of approximately 3:1, i.e., the clutch should add friction to the differential in an amount equal to approximately ⅓ of the slip torque of one wheel on favorable road surface.

Further novel features and other objects of this invention will become apparent from the following detailed description, discussion and the appended claims taken in conjunction with the accompanying drawings showing a preferred structure and embodiment, in which:

FIGURE 1 is a plan view in section through the differential carrier and adjacent axle housings of a motor vehicle drive axle utilizing the invention of this application, a disc clutch unit being disclosed on both sides of the differential;

FIGURE 2 is an enlarged view of the righthand side only of FIGURE 1 showing details of axle housing, axle shaft, differential carrier assembly, and clutch unit relationship with axle components;

FIGURE 3 is a still further enlargement of partial section, illustrating the unitary, separable nature of the multiple disc clutch unit or cartridge;

FIGURE 4 is a section view through the assembled clutch unit taken on line 4—4 of FIGURE 2, enlarged to the same scale as FIGURE 3, and illustrating the oil pickup scoops on the clutch shell;

FIGURE 5 is a side view of one of the driving clutch discs, illustrating the curved oil grooves for cooling and lubrication;

FIGURE 6 is a detail section view through the splined section of the axle shaft taken on line 6—6 of FIGURE 2 and enlarged to the same scale as FIGURE 4; and FIGURE 7 is an enlarged cross-section of one of the "Belleville" spring discs used to provide a pre-load bias maintaining the clutch discs in engagement.

Similar reference numerals refer to the same parts throughout the following description.

Referring to FIGURE 1, in which an exemplary embodiment of the invention is illustrated, a conventional rear axle drive has a carrier 10 with centrally opposed apertures 11, into which the inwardly directed ends of a righthand axle housing 12 and a lefthand axle housing 14 are securely fitted in a well known manner. The inside of the wall structure of carrier 10, around apertures 11, extends axially inward forming tubular extensions 16 and 18, respectively, which provide, at their inner ends, press-fit seats for the outer races of tapered roller bearings 20 and 21. A differential housing 22 is rotatably supported in bearings 20 and 21, the inner race of bearing 20 being fitted on the hub 23 of righthand differential housing 24 and inner race of bearing 21 on the hub 25 of lefthand differential housing 26. An exterior annular flange 27 on differential housing part 26 mounts a conventional ring gear 28 which is rigidly secured by means of rivets 30, and is meshed with and driven by a drive shaft pinion (not shown).

The axle housing apertures 11 of carrier 10 are provided adjacent the bearing seats with internal threads 31 to receive external threads of bearing adjusting nuts 32 and 34, the inside diameters of which are made of sufficient dimension to clear the outside diameter of the hereinafter described disc clutch assemblies.

Differential housing parts 24 and 26 are bolted together by means of the circumferentially disposed bolts 36 and nuts and, in a well known manner, provide transversely directed apertures to receive the arms of a pinion spider 38 having bevel pinions 40 thereon meshing with their respective mating side gears 42 and 44. Both side gears 42 and 44 are axially apertured and their apertures are internally splined, gear 42 being splined to the external end splines 45 of a righthand axle shaft 46 which extends through the axle housing 12 and hub 23 of the differential housing section 24. The back surface of side gear 42 abuts against a bearing plate 48 between the side gear 42 and the inside of differential housing section 24. Side gear 44 is similarly splined to a lefthand axle shaft 50 extending through the axle housing 14 and hub 25 of differential housing section 26, the side gear 44 abutting likewise with its back surface against a bearing plate 52 inserted between the side gear 44 and the inside of differential housing 26. All of the foregoing arrangements of drive axle components, excepting the referred to disc clutch assemblies and the relationship between the bearing adjusting nuts 32 and 34 and the disc clutch assemblies is substantially like the well known construction of conventional rear axle differentials.

The external end portions of differential housing hubs 23 and 25 are axially splined at 54 and 55 to non-rotatably receive clutch cartridge assemblies 60 and 62, respectively, the detailed description of which is now to be described. Clutch assembly 60 as a unit is tightly held in place on the splines 54 of hub 23 by a compressed coil spring 61 inserted between the end of clutch assembly 60 and a sled runner washer 64 splined to the axle shaft 46 adjacent the runout of axle splines 45. A similar coil spring 63 abutting against sled runner washer 65 holds the lefthand clutch assembly 62 engaged with the splines 55 of hub 25.

Although there are two clutch assemblies shown in FIGURE 1, in many cases only one clutch assembly, either right or left, will suffice inasmuch as the addition of a friction clutch between any two relatively rotating members of a differentiating differential mechanism will be effective throughout the differential regardless of which axle is spinning.

FIGURE 2 represents the righthand clutch assembly 60, the lefthand clutch 62 being identical thereto with the exception of being lefthanded. Therefore a description of only the righthand clutch assembly will suffice for the present disclosure.

The hub 23 of differential housing 24, as before described, is provided at its end with external splines 54 and its internal diameter is slightly larger than the axle shaft diameter to clear the splines 45 on the latter. Splines 54 on hub 23 receive the end portions, which for descriptive purposes are designated as the inner end, of internal splines 66 in a tubular exterior shell 72 of the clutch assembly 60.

Referring now to FIGURE 3, the clutch cartridge assembly 60 includes a tubular outer shell 72 with an outside diameter of such predetermined dimension as to clear the inside diameter of the axle housings without necessitating any special machining of the housings. Such housings can thus be standardized stock items. The axial internal splines 66 of shell 72, the ends of which fit over the external splines 54 of differential hub 23, receive outer peripheral teeth 73 of drive clutch discs 74. Close to the outer end of shell 72 (righthand side of FIGURE 3) an internal snap ring 76 fits into an annular groove 77 in the interior splined surface of the shell 72. A similar internal snap ring 78 is placed near the inner end of shell 72 although not as close to the inner end as snap ring 76 is to the outer end. The clutch assembly 60 includes a number of driven clutch discs 80, splined to axle shaft 46, assembled in the shell 72 alternately with drive clutch discs 74. As shown in FIGURE 3, spacer plates 84 are disposed at the inner end of the clutch disc stack adjacent snap ring 78 and a pile of "Belleville" springs 86, stacked with their crowns pointing inwardly, are disposed at the outer end of the disc stack adjacent snap ring 76. FIGURE 2 illustrates use of spacer plates 84 between the clutch discs and spring plates. The piled assembly of spacer rings 84, alternate driving and driven discs 74 and 80 and "Belleville" springs 86 is held in a compressed state by the two snap rings 76 and 78. Such "Belleville" type springs are also known as disc springs and cone spring plates.

It is to be understood that the number of clutch discs, spacers and/or "Belleville" spring plates may vary as determined by the type of application, the size of the differential, and a desired unit pressure on the clutch discs. It has been found by theoretical consideration that a torque bias ratio of 3:1 will be most desirable in the average vehicle application. This desired torque biasing can be achieved, and is determined, by choosing a specific number of active clutch plates a specific thickness and height of the crown of the "Belleville" spring plates and by the number of spring plates in the pile.

Incorporating "Belleville" springs (FIGURE 7) in the disc type clutch assembly has resulted in a compact clutch with proven superiority over disc clutches using ordinary coil springs. This superiority exists in regard to both required space and load rating of the clutch pile. With "Belleville" springs it is possible to obtain a much higher and relatively constant spring load in a shorter space. The higher spring load enables the use of a lesser number of clutch discs to provide a desired friction torque bias. The deflection curve and therefore the load rating of a "Belleville" spring disc can be altered considerably by varying the crown of the spring in proportion to the spring thickness. If the height $h$ of crown 87 is made 1.5 times the thickness $t$ of the disc (FIGURE 7) the deflection curve will be flat for a certain range of compression (which can be readily determined) which means that the force output of the spring is practically constant within this range. It is preferred, therefore, to make use of this inherent characteristic of Belleville spring plates which helps to counteract the tolerance build-up within the clutch assembly and provides an extended constant torque bias life of the clutch. The "Belleville" spring pile is assembled in the clutch shell in a rotatably free manner, that is the spring plates are neither splined to the clutch shell nor to the axle shaft but, with the clutch discs, are held in axial compression within the clutch shell 72 by the two snap rings 76 and 78.

Both driving and driven clutch discs 74 and 80 are made of surface hardened #1010 steel, as by the dry cyanamiding process, and the driving discs 74 are provided with spiral oil grooves 88 (FIGURE 5) on both surfaces. Grooves 88 can be machined or coined and are conveniently formed on a circular arc about a center point $x$ eccentric to the disc center. The center point $x'$ of the groove 88' on the opposite face is offset from the disc center point diametrically opposite center point $x$. Several equally spaced holes 90 are formed through the discs and each oil groove 88 intersects at least one hole 90. As described, the teeth 73 of drive discs 74 are splined to the internal splines 66 of shell 72 and the drive discs have an inside diameter providing clearance around the splines 45 of axle shaft 46. The driven discs 80 have inner peripheral teeth 91 splined to splines 45 of axle shaft 46 and have an outer diameter providing clearance within the internal splines 66 of shell 72. The spacer rings 84 are splined to the internal splines 66 of shell 72.

It is known that effective extended life operation of such a clutch depends largely on adequate lubrication and cooling of the discs. Because the clutch assembly is not submerged in the oil sump of the axle housing, means to provide a flow of lubricating and cooling fluid into the shell and through the clutch discs is necessary. In recent years the use of extreme pressure lubricants and the use of higher oil levels in axle housing sumps have become relatively common and both of these factors enable use of the differential oil to lubricate and cool the clutch discs.

The static level of oil in the axle housing is slightly below the exterior surface of clutch shell 72. Accordingly, press-fit on the exterior of shell 72, near the inwardly disposed end thereof, is a sheet metal band 92 of an appropriate thickness having outwardly directed triangular shaped scoops 93 circumferentially spaced thereon and formed integrally from the band. The outer surfaces of the vertices of the scoops extend tangential to the circumference of the band 92 and the scoop openings 94 are directed toward the direction of rotation. Disposed in the wall of clutch shell 72 under each scoop and a short distance ahead of the position where the vertices of scoops 93 merge with the face of the band 92 are holes 95 which serve as oil passages, best seen in FIGURE 4.

A number of the axle shaft splines 45, at equally spaced apart positions have been milled out throughout an intermediate portion of the splined section of axle shaft 46 (FIGURES 2 and 6) leaving an elongate gap 96 where the spline is missing. Along the length of the clutch assembly, as indicated at gap 97 (FIGURE 4), corresponding gaps 97 between internal teeth 91 of the driven discs 80 have been widened so as to provide unobstructed axial fluid flow passages along the axle shaft within the clutch assembly.

Thus when the axle drive assembly first starts to rotate, oil scoops 93 will dip into the oil sump pocket, between the axle housing 12 and bearing positioning nut 32 and force the oil through the holes 95 in the clutch shell 72 into the cavity 98 between the first spacer of the clutch pile and the bearing plate 68 on the end of hub 23 which also serves to prevent oil flow back along the axle shaft splines to the side gears. From cavity 98 the oil is forced through the passages provided by the milled out gaps 96 between splines on axle shaft 46 and the gaps 97 in driven discs 80 from whence the oil is picked up in the spiral oil grooves 88 in the drive discs 74 which, together with centrifugal force, tends to throw the oil outward, thus lubricating the clutch discs and removing heat. The oil passes through various spaces between clutch discs and the shell and axle to the outer end of the clutch assembly to drain into the axle housing and back to the sump. When the static oil level in the sump starts to drop due to oil in circulation, the clutch is being supplied with splash oil thrown off by the drive gears (not shown) and flowing through a passage 100 (FIGURE 2) in the extension flange 16 of the carrier 10 adjacent the bearing adjusting nut 32 from which it will drain into the axle housing 12 to be picked up by the rotating oil scoops 93 and delivered to the clutch discs.

The axle housing 12 does not have to be internally machined to clear the clutch 60 because the clutch outer diameter is not critical and can be selected to clear the inside of the axle housing. Furthermore, this clutch unit 60 can be pre-assembled on a bench with a predetermined torque bias prior to the assembling of the clutch unit or cartridge to the axle assembly which makes it a wholly self contained unit. By using Belleville spring plates, a considerably lengthened life of constant biasing torque is realized which, with the feature of a predetermined torque bias, eliminates the necessity of mechanism to adjust the clutch bias force during use and while in assembly. This in turn renders unnecessary the need of an opening in the axle housing for adjustment access after assembly. There is no need to provide an especially machined shoulder in the vicinity of a differential clutch output end as means for holding the clutch 60 engaged to the differential housing hub, the present invention utilizing the splined sled runner washer 64 abutting against the runout of the shaft splines 45 forming a spring abutment for coil spring 61. This latter spring arrangement very conveniently permits large manufacturing tolerances.

Returning to FIGURE 2, a spring retainer sleeve 100 with an inwardly disposed annular flange 102 at one end and an outwardly disposed annular flange 104 at its other end. The outer flange end 104 of sleeve 100 is placed within the outer end of clutch cartridge shell 72 against the ends of internal shell splines 66 and retained in position by a spring clip ring 106 in an internal groove at the end of shell 72.

In normal assembly disposition the spring retainer sleeve 100 surrounds the cartridge biasing spring 61 and its associated sled runner washer 64 with a slight radial spacing to eliminate wear against the sled runner during axle operation. The inwardly disposed flange 102 at the outer end of spring retainer 100 is axially spaced away from the sled runner washer 64 in the assembly axle but will serve as an abutment which will be engaged by sled runner washer 64 if it is desired to remove the axle shaft 46 for repacking bearings or replacing an oil seal or retainer. When the axle is removed, spring retainer 100 holds the spring 62 and its associated sled runner washer 64, and prevents them from dropping out of position.

Cap screw 110, threadedly inserted in the axle housing 12 and disposed more or less tangent to the surface of spring retainer 100, serves as a stop to be engaged by the end of clutch cartridge shell 72 and thus prevent inadvertent withdrawal of the cartridge assembly 60 when the axle 46 is withdrawn.

If it is desired to remove the cartridge 60 as well as the axle 46, cap screw 110 can be loosened and a long rod (not shown) with a hook on its end can be inserted through the end of the axle housing and the clutch cartridge 60 drawn out of its position.

One of the more important features enabling effective useful life of this invention is the use of surface hardened steel plates as clutch discs, such material providing a far longer and more efficient service than alternate bronze and steel discs, formerly used in disc clutch piles, which rapidly lose their effectiveness as the discs become worn. The provision of adequate lubrication and cooling by use of high pressure lubricants and, in connection therewith, the herein disclosed novel lubrication system for a friction clutch of this type constitutes another important feature. It should be noted, in connection with the lubrication system, that proper care shall be taken at assembling the clutch to the shaft to align the lubrication gaps 97 in the clutch assemblies with the cooperating passages 96 on the axle shaft to assure unobstructed axial flow of the lubricant.

In operation the device works as follows: as long as both wheels have sufficient traction in straight ahead driving the differential and clutch assembly revolve as a solid unit, however, as soon as one wheel loses traction due to soft ground or slippery road, this causes the driving torque—which is equally divided between both driving axles—to be reduced to a value as determined by the wheel having low traction since the other wheel can only absorb the same small amount of driving torque, resulting in spinning of the wheel with low traction and consequently stalling the vehicle. This tendency is immediately resisted by the friction forces on the clutch plates which require greater torque to turn the wheel having low traction, and this same amount of increased torque is made available on the other wheel to such an extent as to move the vehicle.

In general, this clutch produces the same effect as that obtained by applying a brake, with the exception that it is, in effect, constant and is not dependent on the skill of the driver.

The magnitude of the friction effect is dependent on the number of active clutch plates and number and deflection curve of the Belleville spring as determined by the type of application and is thus under the designer's control to be sufficient to add enough friction to prevent spinning of one wheel under adverse road conditions, but not so much friction that the normal behavior of the vehicle is adversely affected.

With the aforedescribed pre-loaded clutch cartridge construction there are several ways in which the inbuilt or pre-load slip torque value can be readily varied. (1) The pre-load torque can be dropped by inactivating some of the clutch plates by respacing them so some will act as spacers. This can be accomplished by placing several of the externally splined clutch plates 74 together and several of the internally splined clutch plates 80 together so they act as spacers. (2) Removal of any clutch plate will reduce the compression load of the Belleville type springs, thus causing a definite drop in torque. (3) Removal of one Belleville type spring will reduce the compression load on the assembly, thus causing a reduction in torque. (4) A redisposition of the Belleville type washers can be used to accomplish a variation in slip torque. One way to redispose the washers consists in making a plurality of stacks of washers, e.g., 3 or 5 washers, turned end for end. Two Belleville type washers in nested arrangement provide twice the biasing force with the same total deflection as a single Belleville type washer. Two Belleville type washers disposed in opposed arrangement require twice the deflection travel of two nested springs to provide the same biasing force. This latter way can be utilized if the cartridge is to be used in a job where the clutch might wear rapidly and hence tend to lose its compression.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a vehicle drive axle having two axle shafts and a differential mechanism with a rotatable cage and two coaxial internally splined output gears, said axle shafts having externally splined ends in splined drive connection with the internal splines of respective ones of said differential output gears: at least one pre-loaded unitary cartridge type friction slip coupling assembly comprising an internally axially splined cylindrical shell, a plurality of annular coupling discs, alternate ones of which have outer peripheral teeth and the others of which have inner peripheral teeth, stacked within said shell with the outer peripheral teeth engaging the internal splines in said shell, a plurality of annular spring plates within said shell stacked adjacent said coupling discs, and means engaging said shell and the stack of coupling discs and the stack of spring plates and preloading said spring plates to maintain said coupling discs in pre-loaded condition relative to said shell; said unitary coupling assembly being disposed over the splined end of one axle shaft with the inner peripheral coupling disc teeth engaging associated axle end splines and said shell being positively drive connected to said rotatable differential cage through said internal shell splines; spring biasing means disposed between said shell and said associated axle shaft exerting a biasing force tending to maintain said unitary coupling assembly in drive engagement with said rotatable differential cage, a sump in said drive axle for lubricating fluid; and means included in said unitary coupling assembly enabling forced flow of lubricating fluid from said sump axially along said coupling disc stack and outwardly between discs of said coupling disc stack for lubrication and cooling during axle shaft rotation.

2. In the drive axle combination defined in claim 1, said means which enables forced flow of lubricating fluid from the sump comprising a passage through the wall of said shell and a scoop secured to the exterior of said shell over said passage with the scoop facing in the direction of rotation of said coupling assembly when the drive axle shafts are being rotated in a normal driving direction.

3. A pre-loaded unitary cartridge type friction slip coupling assembly comprising an internally axially splined cylindrical shell, a plurality of annular coupling discs, alternate ones of which have outer peripheral teeth and the others of which have inner peripheral teeth stacked within said shell with the outer peripheral teeth engaging the internal splines in said shell, a plurality of annular spring plates within said shell stacked adjacent said coupling discs, means engaging said shell and the stack of coupling discs and spring plates maintaining said coupling discs in pre-loaded condition relative to said shell, and means enabling forced flow of fluid from the exterior of said shell through the shell wall to its interior, axially along said coupling disc stack and outwardly between discs of said coupling disc stack for lubrication and cooling during coupling rotation.

4. In combination with a vehicle drive axle having two axle shafts and a differential mechanism with a rotatable cage and two coaxial internally splined output gears, said axle shafts having externally splined ends in splined drive connection with the internal splines of respective ones of said differential output gears, at least one preloaded unitary cartridge type friction slip coupling assembly comprising an internally axially splined cylindrical shell, a plurality of annular coupling discs, alternate ones of which have outer peripheral teeth and the others of which have inner peripheral teeth, stacked within said shell with the outer peripheral teeth engaging the internal splines in said shell, a plurality of annular cone type spring plates within said shell stacked adjacent said coupling discs, means engaging said shell and the stacks of coupling discs and spring plates to deflect said spring plates and maintain said coupling discs in preloaded condition relative to said shell, said unitary coupling assembly being disposed over the splined end of one axle shaft with the inner peripheral coupling disc teeth engaging associated axle end splines and said shell being positively drive connected to said rotatable differential cage through said internal shell splines, the portion of said axle end splines engaged by the inner peripheral coupling disc teeth having at least a portion of at least one spline relieved to provide, with aligned spaces between the teeth of the coupling discs with internal teeth, an axial passage across the inner peripheries of said coupling discs, grooves in the faces of at least a portion of said coupling discs extending from the inner peripheries to the outer peripheries between every adjacent pair of coupling discs, and means for enabling fluid to be forced from the exterior of said shell to its interior and through said axial passage and thence into said grooves.

5. For use in combination with a vehicle drive axle having two axle shafts and a differential mechanism with a rotatable input member and two outputs coaxial with said input member, said axle shafts being drive connected with respective ones of said differential outputs: a preloaded unitary cartridge type friction slip coupling assembly comprising a cylindrical shell, a stack of annular coupling discs, a stack of cone type annular spring plates, and means secured to said shell maintaining said discs and plates in aligned, stacked preloaded compression, including stops removably fixed to the interior of said shell near each end, said coupling discs and cone type spring plates being maintained between said stops with said cone type spring plates in preloaded condition between one of said stops and said clutch disc; said coupling assembly having a first means including said shell adapted to be drive connected to said differential input member and a second means including a portion of said coupling discs adapted to be drive connected to one of said differential outputs.

6. In combination with a vehicle drive axle having two axle shafts and a differential mechanism with a rotatable cage and two coaxial internally splined output gears, said axle shafts having externally splined ends in splined drive connection with the internal splines of respective ones of said differential output gears, at least one preloaded unitary cartridge type friction slip coupling assembly comprising an internally axially splined cylindrical shell, a plurality of annular coupling discs, alternate ones of which have outer peripheral teeth and the others of which have inner peripheral teeth, stacked within said shell with the outer peripheral teeth engaging the internal splines in said shell, a plurality of annular cone type spring plates within said shell stacked adjacent said coupling discs, means engaging said shell and the stacks of coupling discs and spring plates to deflect said spring plates and maintain said coupling discs in preloaded condition relative to said shell, said unitary coupling assembly being disposed over the splined end of one axle shaft with the inner peripheral coupling disc teeth engaging associated axle end splines and said shell being positively drive connected to said rotatable differential cage through said internal shell splines, spring biasing means disposed between said shell and said associated axle shaft exerting a biasing force tending to maintain said unitary coupling assembly in drive engagement with said differential cage, and a retainer for said spring biasing means on said coupling shell engageable by said spring biasing means upon removal of the associated axle shaft to retain said spring biasing means with said coupling assembly.

7. In combination with a vehicle drive axle having two axle shafts and a differential mechanism with a rotatable cage and two coaxial internally splined output gears, axle housing means for said shafts and mechanism, said axle shafts having externally splined ends in splined drive connection with the internal splines of respective ones of said differential output gears, at least one preloaded unitary cartridge type friction slip coupling assembly comprising an internally axially splined cylindrical shell, a plurality of annular clutch discs, alternate ones of which have outer peripheral teeth and the others of which have inner peripheral teeth, stacked within said shell with the outer peripheral teeth engaging the internal splines in said shell, a plurality of annular cone type spring plates within said shell stacked adjacent said coupling discs, and means engaging said shell and the stacks of coupling discs and spring plates to deflect said spring plates and maintain said coupling discs in preloaded condition relative to said shell, said unitary coupling assembly being disposed over the splined end of one axle shaft with the inner peripheral coupling disc teeth engaging associated axle end splines and said shell being positively drive connected to said rotatable differential cage through said internal shell splines, and removable means secured to a wall of said housing means located to be engaged by and to retain the coupling shell in assembly upon removal of the associated axle shaft.

References Cited in the file of this patent

UNITED STATES PATENTS

| | | |
|---|---|---|
| 1,315,236 | Parker | Sept. 9, 1919 |
| 1,487,073 | Nogrady | Mar. 18, 1924 |
| 1,622,261 | Payne | Mar. 22, 1927 |
| 1,843,987 | Ragan | Feb. 9, 1932 |
| 1,979,414 | Smith | Nov. 6, 1934 |
| 2,578,308 | Iavelli | Dec. 11, 1951 |
| 2,733,798 | Almen et al. | Feb. 7, 1956 |
| 2,743,792 | Ransom | May 1, 1956 |
| 2,778,472 | Young | Jan. 22, 1957 |
| 2,788,877 | Richardson | Apr. 16, 1957 |